Aug. 15, 1944.    E. G. WRIGHT    2,356,022
INSECT TRAP
Filed Dec. 6, 1943

INVENTOR.
Eddie G. Wright
BY Henry F. R. Mohlen
Agt.

Patented Aug. 15, 1944

2,356,022

UNITED STATES PATENT OFFICE 2,356,022

INSECT TRAP

Eddie G. Wright, Oakland, Calif.

Application December 6, 1943, Serial No. 513,021

2 Claims. (Cl. 43—120)

My invention relates to improvements in insect traps, and has for its object the provision of a device of this character comprising a cup-shaped member for the reception of a fluid, preferably of poison, which cup-shaped member is provided with a shaft terminating in a plate adapted to carry an object which is to be protected against insects, for instance a garbage can or container which—when not protected in the manner provided for by the present invention—would furnish food for insects, particularly for ants; in this way my invention will make it unnecessary to purchase repeatedly ant or insect poison which has to be distributed over the floor or among the garbage.

Another object of the present invention is the provision of a device of the character described which is simple in construction, cheap to manufacture, light in weight, comparatively small in size, but sturdy and well adapted to withstand the rough usage to which such devices are ordinarily subjected.

Further objects of the instant invention reside in any novel feature of construction or operation or novel combination of parts present in the embodiment of the invention described and shown in the accompanying drawing whether within or without the scope of the appended claims and irrespective of other specific statements as to the scope of the invention contained herein.

In the drawing.

Similar numerals refer to similar parts throughout the several views.

Figure 1:
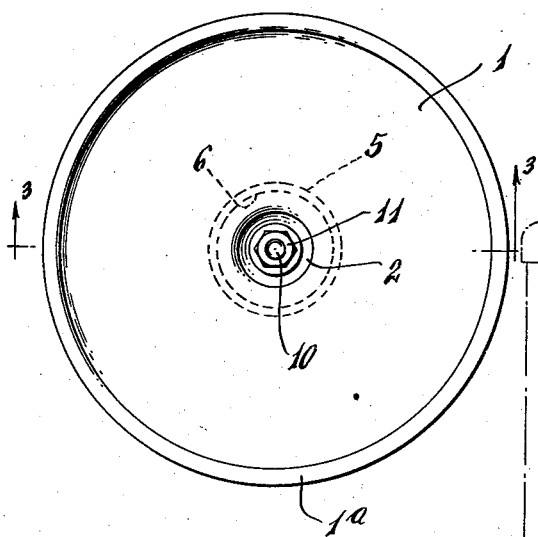
Figure 1 is a top plan view of a preferred embodiment of my invention.

A top plate 1, which may be of any desired shape and which is circular in the instance shown, is preferably provided with a raised rim 1a at its outer edge and with a recess 2 in its center. The lower surface 3 of the recess 2 rests against a sleeve member 4 which extends from the center of the upper bottom side of a cup 5. The cup 5 is adapted to contain a liquid 6, such as poison or simply water if the insects against which the device is to be used are unable to pass through water. The lower hub-like portion 7 of cup 5 rests against the hub 9 of a base plate 8.

The parts 1, 5, and 8 can be made of any suitable material such as wood, metal, plastic material or the like, and they can be connected to each other by means of gluing, soldering, welding, etc., or they can be made as a unit of one single piece of material. I prefer, however, to connect the parts 1, 5, and 8 to each other by means of a screw bolt 10, which is extended through the center of recess 2, through the sleeve member 4, and through the hub 9 and which is held in place by means of nuts 11 and 12. This arrangement, which is in the instance shown, allows the taking apart of the device for the purpose of cleaning the same or the like.

Figure 3:
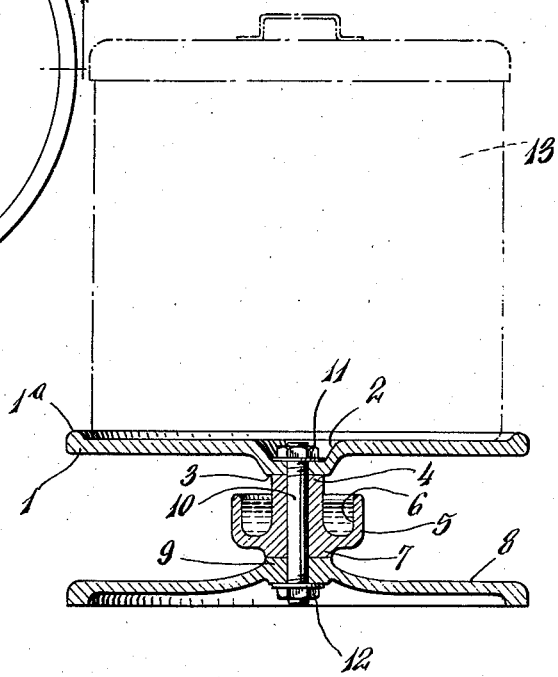
Fig. 3 is a sectional view on the line 3—3 of Fig. 1.
Figure 2:
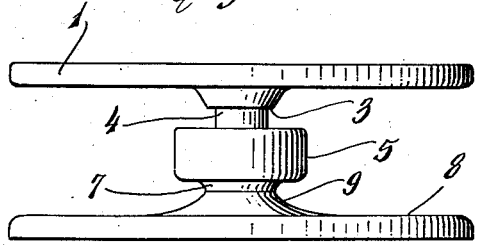
Fig. 2 is a side elevation of said embodiment.

The base plate 8, as may be seen in the drawing, is sufficiently large so as to prevent the device from tipping over when a large and heavy object, for instance a container 13 (indicated in dash-and dotted lines in Fig. 3) is placed upon plate 1.

While there has been shown and described and pointed out the fundamental novel features of the invention as applied to a single modification, it will be understood that various omissions and subtitutions and changes in the form and details of the device illustrated and in its operation may be made by those skilled in the art without departing from the spirit of the invention. It is the intention, therefore, to be limited only as indicated by the scope of the following claims.

Having thus described my invention, what I claim and desire to secure by Letters Patent in the United States is:

1. An insect trap comprising a base plate of circular shape; a cup carried by said base plate and including a sleeve portion which extends vertically from the center of the upper bottom side of said cup and which protrudes over the upper edge of said cup; a top plate secured to said sleeve portion by means of a bolt which extends through the center of said bottom plate, through said sleeve portion, and through the center of said top plate, and which has nuts on both ends located in recesses of said top and bottom plates; said top plate being adapted to carry a heavy object which is to be protected against insects, said bottom plate being so large that the trap cannot tip over when said heavy object is placed upon said top plate, and said cup being adapted to be filled with a fluid which prevents insects from passing through it, all substantially as set forth.

2. The combination, in an insect trap adapted to support heavy loads and having a cup between a base plate and a top plate, of a sleeve portion formed as a unit with said cup and protruding from its upper bottom center over its upper edge, with a bolt extended through said sleeve portion and through said base and top plates, and nuts screwed upon the ends of said bolt and being located in recesses of said top and base plates, all substantially as described.

EDDIE G. WRIGHT.